US012146990B1

(12) United States Patent
Gill et al.

(10) Patent No.: US 12,146,990 B1
(45) Date of Patent: Nov. 19, 2024

(54) SPACE-BASED LIDAR SYSTEM

(71) Applicant: United States of America as represented by the Administrator of NASA, Washington, DC (US)

(72) Inventors: Nathaniel Gill, Greenbelt, MD (US); Kenneth McCaughey, Greenbelt, MD (US)

(73) Assignee: United States of America as represented by the Administrator of NASA, Washington, DC (US)

( * ) Notice: Subject to any disclaimer, the term of this patent is extended or adjusted under 35 U.S.C. 154(b) by 1496 days.

(21) Appl. No.: 16/513,071

(22) Filed: Jul. 16, 2019

(51) Int. Cl.
*G01C 3/08* (2006.01)
*G01S 7/481* (2006.01)
*G01S 7/484* (2006.01)
*G01S 7/4861* (2020.01)
*G01S 7/4865* (2020.01)
*G01S 17/894* (2020.01)
*G01S 17/933* (2020.01)

(52) U.S. Cl.
CPC .......... *G01S 7/4861* (2013.01); *G01S 7/4813* (2013.01); *G01S 7/4818* (2013.01); *G01S 7/484* (2013.01); *G01S 7/4865* (2013.01); *G01S 17/894* (2020.01); *G01S 17/933* (2013.01)

(58) Field of Classification Search
CPC .... G01S 7/4861; G01S 7/4813; G01S 7/4818; G01S 7/484; G01S 7/4865; G01S 17/894; G01S 17/933
See application file for complete search history.

(56) References Cited

U.S. PATENT DOCUMENTS

| 10,408,935 B1* | 9/2019 | Maryfield | H04B 10/40 |
| 2005/0174445 A1* | 8/2005 | Yamashina | H04N 23/66 |
| | | | 348/E7.086 |
| 2019/0064364 A1* | 2/2019 | Boysel | G05D 1/0231 |

OTHER PUBLICATIONS

Suematsu, Y., et al. The Solar Optical Telescope of Solar-B (Hinode): The Optical Telescope Assembly. Solar Phys, 2008, 249: 197-220. chrome-extension://efaidnbmnnnibpcajpcglclefindmkaj/https://citeseerx.ist.psu.edu/document?repid=rep1&type=pdf&doi=3f522b546e1e2ac47067044af4344a422e71bb7f (Year: 2008).*
Bruzzi, Jonathan R., et al. "A Compact Laser Altimeter for Spacecraft Landing Applications". Johns Hopkins APL Technical Digest, vol. 30, No. 4 (2012). chrome-extension://efaidnbmnnnibpcajpcglclefindmkaj/https://secwww.jhuapl.edu/techdigest/content/techdigest/pdf/V30-N04/30-4-Bruzzi.pdf (Year: 2012).*
Storm, Mark et al. "Cubesat Lidar Concepts for Ranging, Topology, Sample Capture, Surface, and Atmospheric Science." 31st Annual AIAA/USU 2017 Conference on Small Satellites, p. 1-7. (Year: 2017).*

* cited by examiner

*Primary Examiner* — Samantha K Nickerson
(74) *Attorney, Agent, or Firm* — Derek J. Langdon; Matthew F. Johnston; Trenton J. Roche

(57) ABSTRACT

Various embodiments relate to a light detecting and ranging (LiDAR) system including: a space-qualified transmitter including a space-qualified microelectromechanical system (MEMS); a space-qualified receiver; a space-qualified short-range imager connected to the space-qualified receiver; a space-qualified long-range imager connected to the space-qualified receiver.

14 Claims, 5 Drawing Sheets

SPACE-BASED LIDAR SYSTEM

ORIGIN

The invention described herein was made by one or more employees of the United States Government and may be manufactured and used by or for the Government for governmental purposes without the payment of any royalties thereon or therefor.

BACKGROUND

Light Detection and Ranging (LiDAR) is a remote sensing technology that uses light pulses to measure ranges or distances of an object. Information extracted from these measurements may be used to obtain three-dimensional (3-D) images of an object at a distance. To determine the 3-D image, time differences or time of flight estimations are determined between the transmission of laser light pulses and the reception of reflected signals. Conventional components used to provide time of flight estimations can be slow, inaccurate, or too large to provide the capabilities required in applications like space exploration and military surveillance. Thus, there is a need for improved LiDAR systems.

SUMMARY

Based upon the present need for an improved LiDAR system, a brief summary of various embodiments is presented. Some simplifications and omissions may be made in the following summary, which is intended to highlight and introduce some aspects of the various embodiments, but not to limit the scope of the invention. Detailed descriptions of embodiments adequate to allow those of ordinary skill in the art to make and use the inventive concepts will follow in later sections.

Various embodiments relate to a light detecting and ranging (LiDAR) system comprising: a space-qualified transmitter; a space-qualified receiver; a space-qualified imager; and at least two reference cubes. The LiDAR system may comprise a long wave infrared camera and a laser range finder.

In various embodiments, the LiDAR system may comprise a narrow field of view visual camera and a wide field of view visual camera. The space-qualified receiver may comprise four photodiodes. The LiDAR system may comprise flight thermistors, GSE thermistors, and a laser diode array.

The LiDAR system may be configured to provide real-time images and high-resolution images. The LiDAR system may be configured to provide ranging measurements to guide a robotic servicer as it approached a satellite

BRIEF DESCRIPTION OF THE DRAWINGS

To better understand various embodiments, reference is made to the accompanying drawings, wherein.

DETAILED DESCRIPTION

Figure 1:
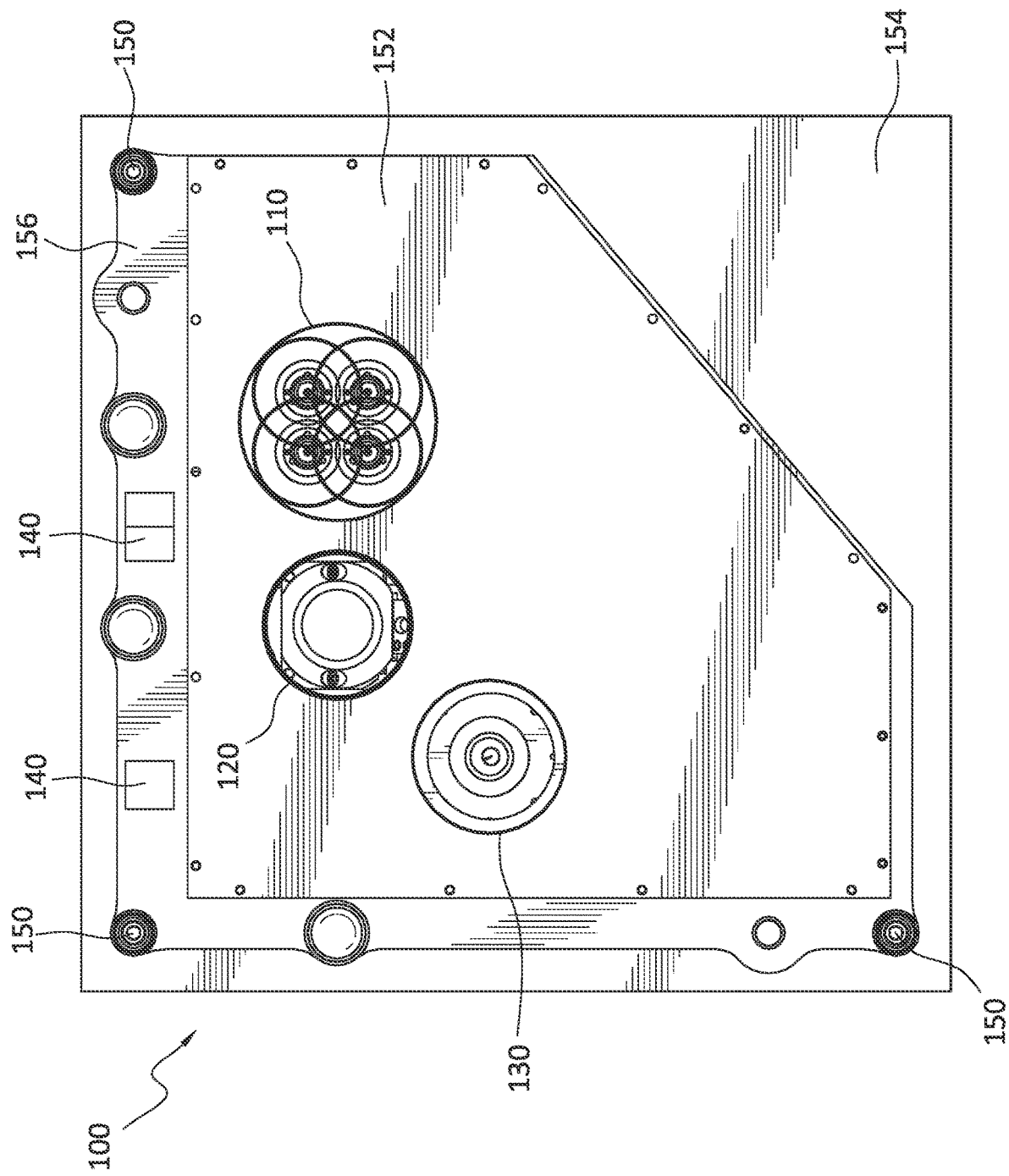
FIG. 1 depicts a top view of a reconfigurable, solid-state, scanning LiDAR system.

Referring now to the drawings, in which like numerals refer to like components or steps, there are disclosed broad aspects of various embodiments.

In space rendezvous and proximity operations during satellite servicing missions, both range finding and imaging of the target to be serviced is required. The satellite servicing mission aims to autonomously rendezvous with, and robotically service an existing government-owned satellite in Low Earth Orbit (LEO). A LIDAR will be utilized during the "Autonomous Rendezvous & Docking" portion of the mission operating in a range finder mode and an imaging mode. In high orbit satellite servicing and planetary science missions a harsh environment and long mission life coupled with the need for long range, high measurement speed, and centimeter level accuracy presents a unique set of requirements on an imaging proximity LiDAR. Various aspects and elements of an embodiment of such a LiDAR having a range finding mode and an imaging mode will be described below. The described embodiment is a low cost, modular, and flexible platform on which to implement many types of high speed, high accuracy imaging LiDAR applications that is optimized for non-cooperative orbital rendezvous at ranges of 1.2 kilometers to <1 meter, and the embodiment may produce full 200×200 pixel range images at 5 Hz, and also offers the flexibility to generate 16 Megapixel range images at mm level range accuracies.

The embodiment described below provides a long-range space flight MEMS scanning LiDAR, something that is not available on the market today. This presents many advantages, such as lack of macro-scale mechanisms, high measurement accuracy and precision, lower mass volume and power, and fast measurement acquisition rates. It blurs the lines between flash and scanning LiDAR and gives mission designers more flexibility and capability.

The described LiDAR system may be a low cost, modular, and flexible platform that implements many types of high speed, high accuracy imaging LiDAR applications. Currently optimized for non-cooperative orbital rendezvous at ranges of 1.2 km to less than one meter, the LiDAR system may produce full 200-pixel by 200-pixel range images at 5 Hz. The LiDAR system may also offer the flexibility to generate 16 Megapixel range images at millimeter-level range accuracies.

Figure 2:
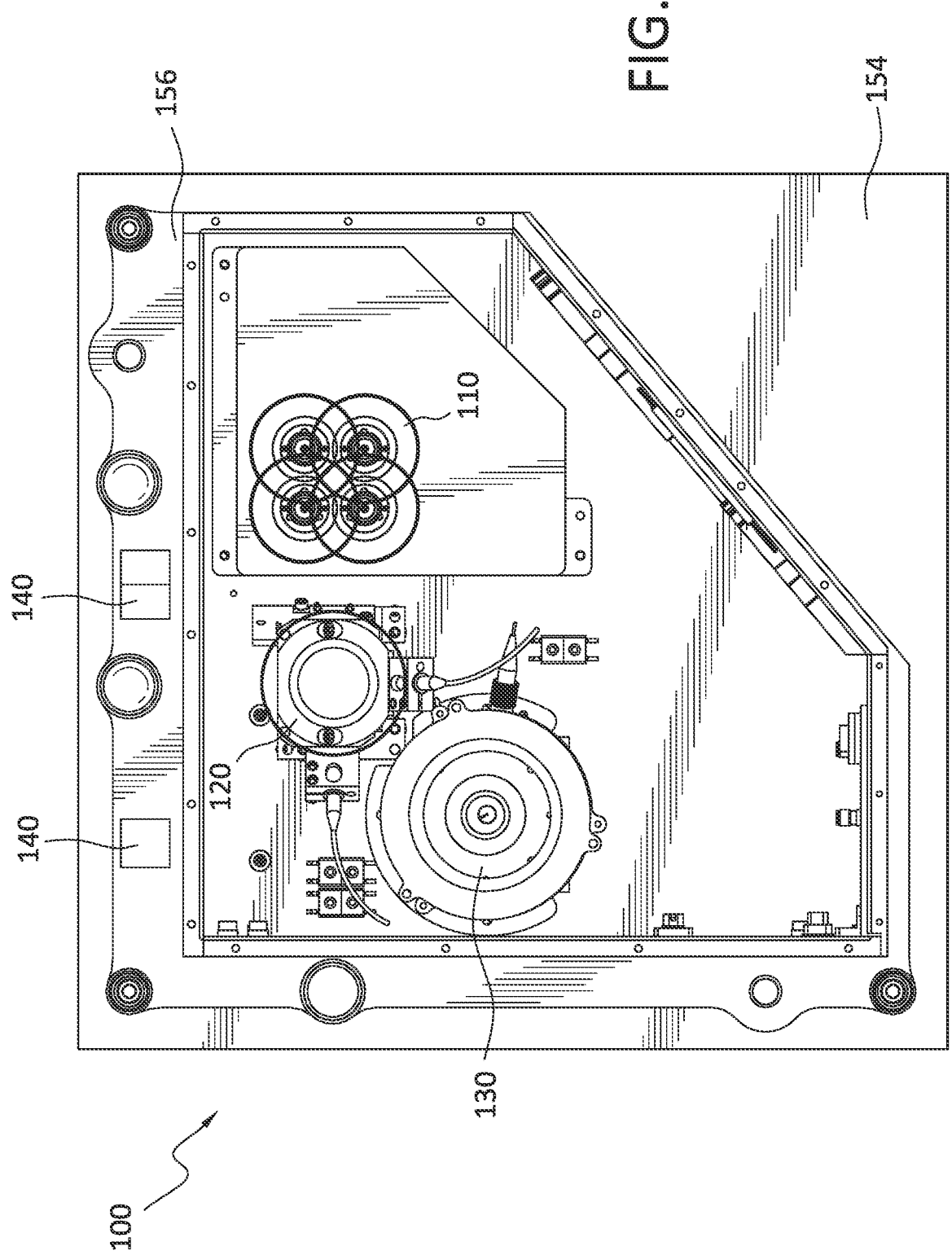
FIG. 2 illustrates a second view of a LiDAR system with the top cover removed.
Figure 3:
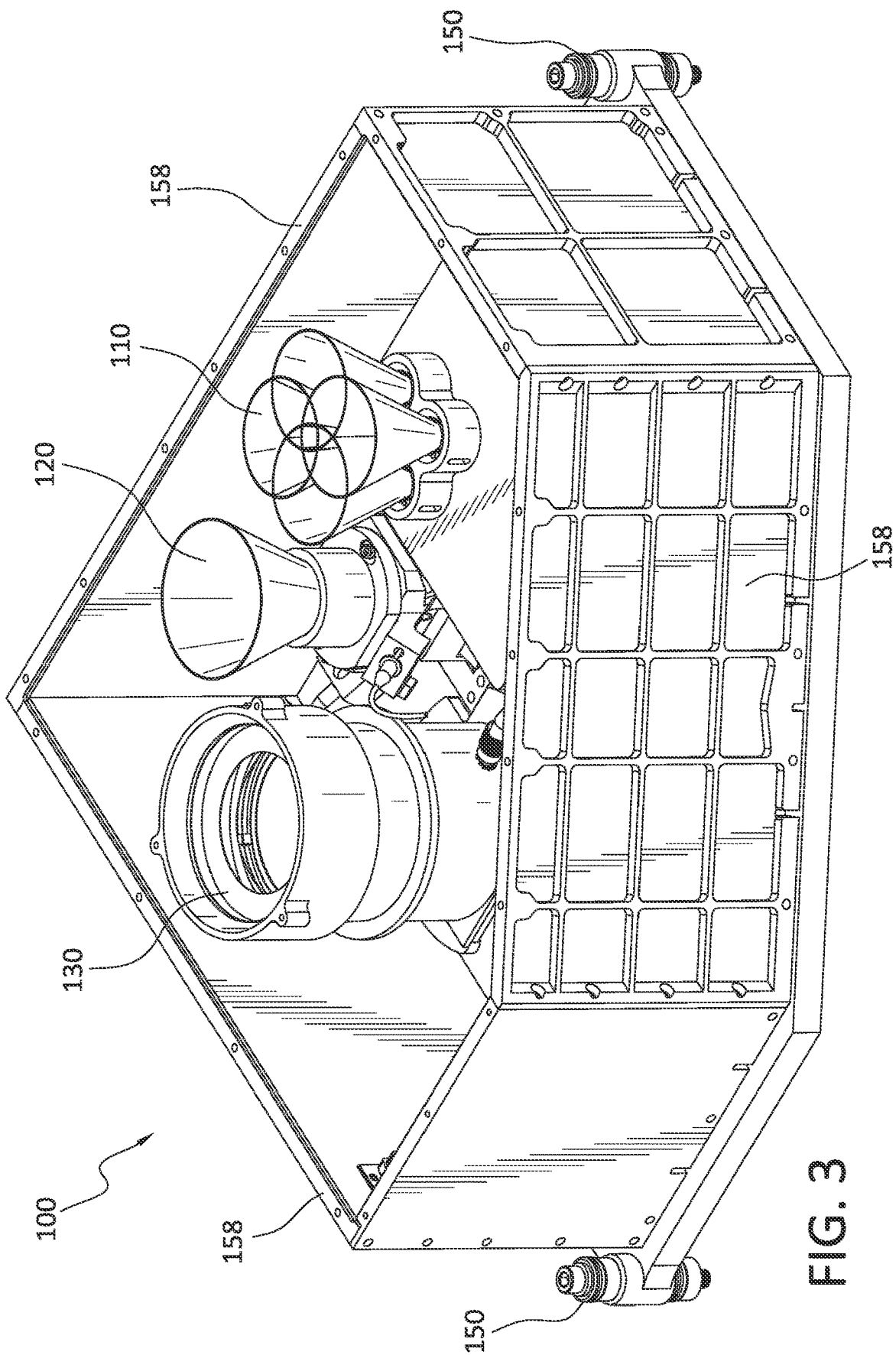
FIG. 3 illustrates a third perspective view of a LiDAR system 100 with the top cover removed.
Figure 4:
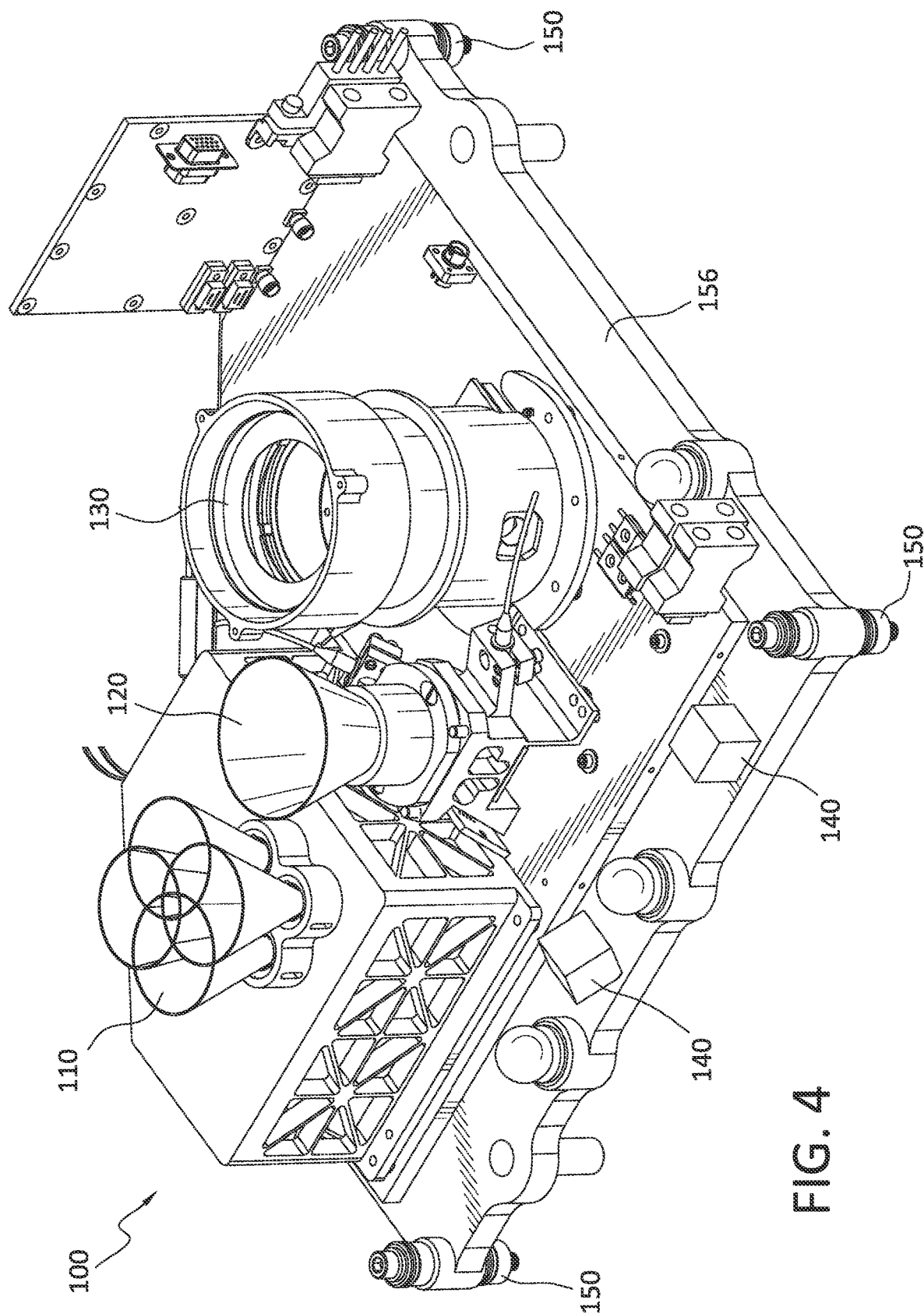
FIG. 4 illustrates a fourth perspective view of a LiDAR system 100 with the top cover and side covers removed.

FIG. 1 depicts a top view of a reconfigurable, solid-state, scanning LiDAR system 100. FIG. 2 illustrates a second view of a LiDAR system 100 with the top cover removed. FIG. 3 illustrates a third perspective view of a LiDAR system 100 with the top cover removed. FIG. 4 illustrates a fourth perspective view of a LiDAR system 100 with the top cover and side covers removed. LiDAR System 100 may include an image detector 110, a Laser Range Finder (LRF) detector 120, a transmitter 130, alignment cubes 140, a LiDAR system base plate 156, a top cover 152, and a spacecraft platform 154.

The image detector 110 may be for example the Goddard Reconfigurable Solid-state Scanning Lidar (GRSSLi), but other space-qualified image detectors may be used as well. The image detector 110 may have four photodiodes with four non-imaging optics combined into a single highly sensitive wide field of view receiver enabling 3D point cloud generation and pose estimation. Further, the four photodiodes are used in order to increase the signal to noise ratio using four smaller apertures without using a single large aperture. Output signals from all four photodiodes may be combined and processed. Internal circuitry may include a transimpedance amplifier. The transmitter 130 may transmit laser pulses towards a target of interest. The laser pulses reflect off of the target of interest and then are received by the image detector 110. The various parameters of the light pulses such as pulse-width, pulse repetition frequency, and the time when the pulse transmission begins is selected based upon the specific requirements of the near field imaging requirement for the image detector 110. Further, the transmitter 130 includes a microelectromechanical system (MEMS) for steering the transmitted laser light pulses in a desired direction. Hence, the MEMS mirror may be used to scan the light beam over a desired area of space. The use of the MEMS mirror reduces the mechanical wear and other issues associated with a mechanically scanned mirror as used in previous LiDAR systems.

The LRF detector 120 includes a long-range narrow field of view telescope. Examples of an LRF detector 120 are such as the one developed for the Goddard Reconfigurable Laser Ranger (GRLR) or the one described in related U.S. patent application Ser. No. 16/143,804 filed Sep. 27, 2018, entitled LONG DISTANCE SPACE FLIGHT LASER RANGE FINDER, which is incorporated herein by reference for all purposes. Also, other space-qualified LRFs may be used as well. LRF detector 120 may have a single photodiode. Like image detector 110, LRF detector 120 may use a transimpedance amplifier. The transmitter 130 may transmit laser pulses towards a target of interest. The laser pulse reflect off of the target of interest and then are received by the LRF detector 120. The various parameters of the light pulses such as pulse-width, pulse repetition frequency, and the time when the pulse transmission begins is selected based upon the specific requirements of the near field imaging requirement for the LRF detector 120. Further, as described above the transmitter 130 includes a MEMS mirror for steering the transmitted laser light pulses in a desired direction.

At long range, a LIDAR system 100 may use a narrow field of view telescope to collect laser reflections using the LRF detector 120. Such collection may enable range bearing calculations from roughly 1.2 km down to about 40 m. Because the long-range receiver is paired with a scanning laser transmitter, the spacecraft bus does not have to point as accurately as it otherwise would need to with a fixed narrow pencil beam laser range finder. At closer ranges, image detector 110 of LiDAR system 100 will take over from the LRF detector 120 and may combine four non-imaging optics into a single highly sensitive wide field of view receiver. This may enable 3-D point cloud generation and pose estimation.

LiDAR system 100 does not paint a scene with a mechanical scanner, but rather may illuminate the target with a single pulse of laser light that is directed using a space-qualified MEMS mirror. This illumination serves to eliminate moving parts that could be prone to failure. A telescope captures the returning photons and images them on a photon-sensitive detector array. Each pixel may measure the photons' times of flight to create a 3-D image of the target.

LiDAR system 100 may also include two reconfigurable FPGAs configured to implement real time LiDAR signal processing and host machine vision algorithms that interpret 3-D image data generated by LiDAR system 110. For example, a high speed analog-to-digital converter (ADC) may capture samples of the RF waveform generated by the amplified photo diodes in the receivers. This, as well as the ample signal processing capability in the FPGAs within the digitizer card allow many possible design enhancements for various applications. For example, by accumulating multiple waveforms, returned pulses that are otherwise obscured by noise sources can be recovered, which can increase the effective max range and range resolution of the system without modifying any hardware. Other signal processing improvements may be made as well.

The FPGAs and memory resources have also been designed to support the inclusion of pose estimation algorithms such as the one described in the attached issued patent letter.

To cut system testing costs and improve safety, the laser and receiver technology may use eye-safe 1550 nm IR signals and automatic safety interlocks.

If more distant ranges or reduced system power are desired, portions of the design may be swapped for more efficient 1 μm wavelength devices, while leaving the rest of LiDAR system 100 largely unchanged. As the LiDAR front end and main electronics may reside in separate boxes and the main electronics box uses compact Peripheral Component interconnect (cPCi) modularity, as long as the interfaces are maintained, swapping out the front ends may be a low-cost process.

LiDAR system 100 may be a low cost, high performance, reconfigurable, high reliability, radiation-hardened, long range, low size weight. LiDAR system 100 also may have the capability to generate 3-D imagery in practically any lighting condition from long ranges, and provide ample processing resources to interpret, compress or otherwise analyze the collected data in real time.

In space, devices may be exposed to high levels of ionizing radiation that decrease reliability and cause electronics to degrade. LiDAR system 100 may be radiation-hardened to protect against such ionizing radiation, which is measured by radiation-absorbed-doses (rads). This protection may shield LiDAR system 100 from high energy particles to a threshold of 100 kilorads. In alternative embodiments, some components may be radiation-hardened to less than 100 kilorads while other components may be radiation-hardened to more than 100 kilorads.

LiDAR system 100 may meet specific performance requirements. It may perform laser range finding from approximately 1.2 km down to 30 m, a range accuracy of 2 cm, and a range resolution of less than 1 cm. From approximately 35 m down to 1.6 m, LiDAR system may perform 3-D imaging of a target.

LiDAR system 100 may have a warm up time of less than ten minutes, a measurement rate of 1 Hz, a measurement latency no more than 50 ms, and a measurement latency jitter no more than 5 ms. It may have a mass of less than 10 kg.

LiDAR system 100 may also comprise reference cubes 140, wherein a first reference cube 640 may be tilted at substantially a 45-degree angle to a second reference cube 140. The reference cubes 140 are accurately mounted on the system base plate 156 and are used to provide alignment of the LiDAR system 100 with other components of the spacecraft using known optical alignment techniques.

Further quasi-kinematic coupling may be used between the base plate 156 and the spacecraft platform using couplers 150. Further, the image detector 110 and LRF detector 120 may be quasi-kinematically coupled to the base plate. The quasi-kinematic coupling provides for a very accurate alignment between the various elements of the LiDAR system 100.

Figure 5:
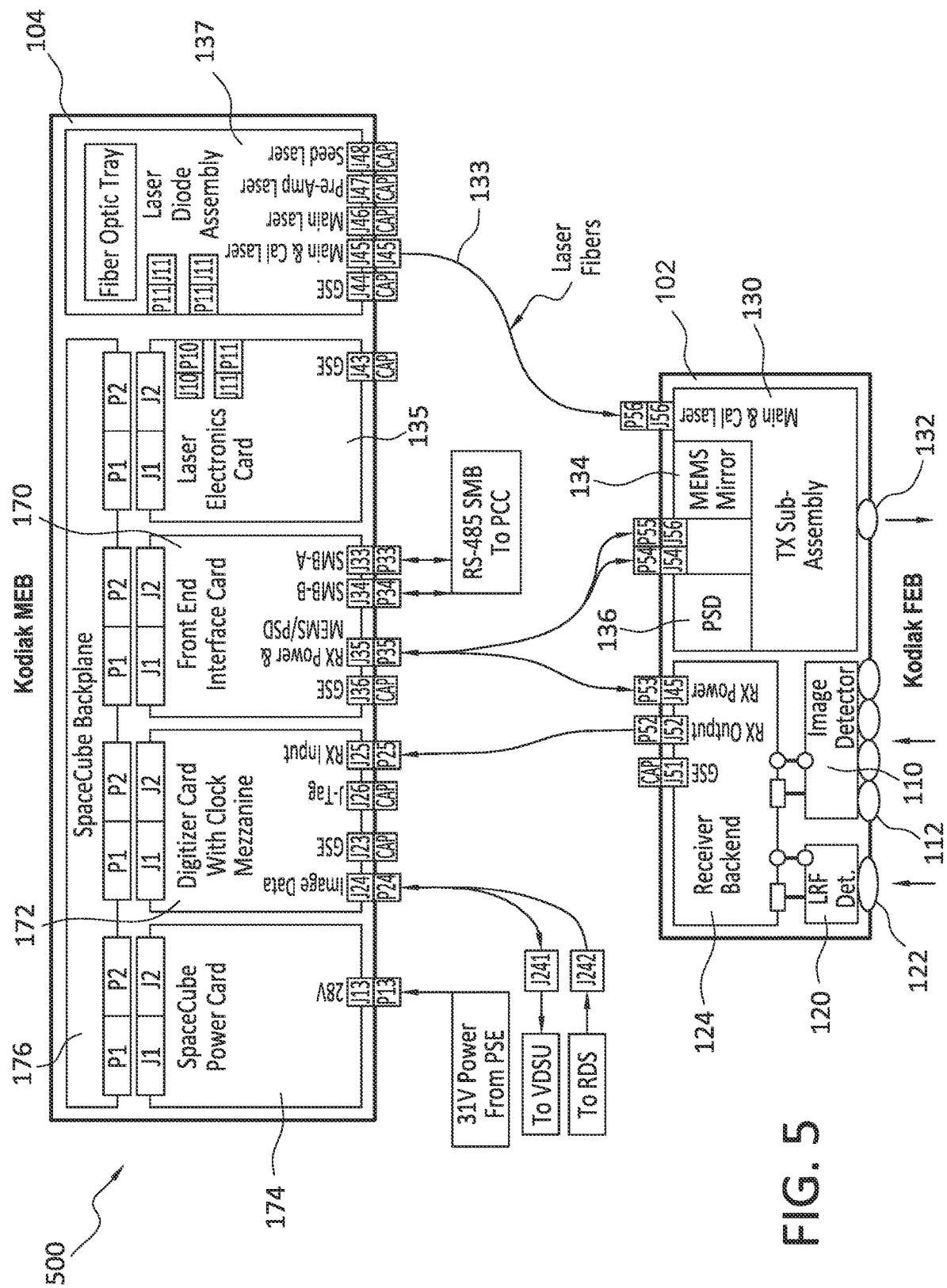
FIG. 5 illustrates a system block diagram of the LiDAR system.

FIG. 5 illustrates a system block diagram 500 of the LiDAR system 100. Within the Front-End Box (FEB) 102, image detector 110 and LRF detector 120 may be separately coupled to the receiver backend 124. As described below, fiber optics 133 may be used to interface between the FEB 102 and the Main Electronics Box (MEB) 104.

The image detector 110 and LRF detector 120 may be separately coupled to receiver backend electronics 124. Four image detector optical elements 112 receive light that is then directed towards each of four image detector elements in the image detector 110. An LRF detector optical element 122 receives light that is then directed to an image detector element in the LRF detector 120. The outputs of the LRF detector 120 and the image detector 110 are then fed into the receiver backend 124. The receiver backend 124 transmits the received signals from the LRF detector 120 and the image detector 110 to the digitizer card 172. The digitizer card 172 interfaces with the spacecube backplane 172, where the spacecube provides processing resources to process the received data.

The laser fibers 133 may include two fiber optic connections from the MEB to the FEB: one for the main laser and another for the calibration laser. The main laser fiber may use a 1553 nm fiber while the calibration laser fiber may use a 978 nm fiber. Main laser input may be applied to a MEMS mirror 134. The MEMS mirror 134 may be a 5 mm mirror. Further, the MEMS mirror is space-qualified in order to survive in the space environment. The MEMS mirror 134 is then moved to different positions to scan the desired area. The MEMS mirror 134 may receive control input from the front-end interface card 170 which receives control input from the spacecube software. Calibration laser input may be applied to Position Sensitive Detector (PSD) sensor 136. The PSD allows for real time calibrated measurements of MEMS mirror azimuth and elevation angle as well as supplying independent laser safety interlock. If the mirror scans the system is eye safe. If it stops scanning unexpectedly the PSD tells the FPGAs this has occurred and the FPGAs shut down the laser in a few milliseconds to avoid any potential safety hazards.

Using splitters (not shown), signals may be applied to respective pulse injectors for both image detector 110 and LRF detector 120. A laser diode assembly 131 produces the main laser signal and the calibration laser signal. The laser diode assemble 131 is controlled by the laser electronics card 135 which receives control input from the spacecube software.

The term space-qualified as used herein describes equipment and components that have met the various requirements to be used in space. This may for example include being able to withstand the various types of radiation present in space, the temperature variations, and the forces present during launch and deployment in space. Also, outgassing of components is a consideration. A space-qualified system or component is one that meets the understood and established requirements set forth by various space agencies and organizations. Each of the components described in the embodiments above are space-qualified components.

It should be apparent from the foregoing description that various embodiments of the invention may be implemented in hardware and/or firmware. Furthermore, various embodiments may be implemented as instructions stored on a non-transitory machine-readable storage medium, which may be read and executed by at least one processor to perform the operations described in detail herein. A non-transitory machine-readable storage medium may include any mechanism for storing information in a form readable by a machine, such as a personal or laptop computer, a server, or other computing device. Thus, a machine-readable storage medium may include read-only memory (ROM), random-access memory (RAM), magnetic disk storage media, optical storage media, flash-memory devices, and similar storage media.

It should be appreciated by those skilled in the art that any block diagrams herein represent conceptual views of illustrative circuitry embodying the principals of the invention. Similarly, it will be appreciated that any flow charts, flow diagrams, state transition diagrams, pseudo code, and the like represent various processes which may be substantially represented in machine readable media and so executed by a computer or processor, whether or not such computer or processor is explicitly shown.

Although the various embodiments have been described in detail with reference to certain aspects thereof, the invention is capable of other embodiments and its details are capable of modifications in various obvious respects. As apparent to those skilled in the art, variations and modifications can be affected while remaining within the spirit and scope of the invention. Accordingly, the foregoing disclosure, description, and figures are for illustrative purposes only and do not in any way limit the invention, which is defined only by the claims.

What is claimed is:

1. A light detecting and ranging (LiDAR) system comprising:
    a space-qualified transmitter configured to transmit at least one first laser light pulse and at least one second laser light pulse, the space-qualified transmitter includes a space-qualified microelectromechanical system (MEMS);
    a space-qualified receiver configured to receive the at least one first laser light pulse and the at least one second laser light pulse;
    a space-qualified short-range imager connected to the space-qualified receiver; and
    a space-qualified long-range imager connected to the space-qualified receiver,
    wherein the LiDAR system has a range accuracy less than about 2 cm and a range resolution of less than about 1 cm,
    wherein the space-qualified transmitter further comprises a position sensitive detector (PSD) configured to determine the position of the space-qualified MEMS mirror,
    wherein the space-qualified short-range imager is configured to capture the at least one first laser light pulse, and
    wherein the space-qualified long-range imager is configured to capture the at least one second laser light pulse.

2. The LiDAR system of claim 1, further comprising:
    a system base plate to which the space qualified short range imager and space-qualified long range imager are mounted; and
    two optical alignment reference cubes mounted to system base plate.

3. The LiDAR system of claim 2, further comprising:
    first quasi-kinematic couplings connecting the short-range imager and space-qualified long-range imager to the system base plate.

4. The LiDAR system of claim 3, further comprising:
    second quasi-kinematic couplings connected to the system base plate configured to further connect to a spacecraft platform.

5. The LiDAR system of claim 1, wherein the short range imager further comprises four detector diodes.

6. The LiDAR system of claim 1, wherein the short range imager further operates at a range of less than 35 meters.

7. The LiDAR system of claim 1, wherein the long range imager further operates at a range of 30 to 1200 meters.

8. The LiDAR system of claim 1, wherein the short range imager has a first predetermined field of view.

9. The LiDAR system of claim 8, wherein the long-range imager has a second predetermined field of view, wherein the first predetermined field of view is wider than the second predetermined field of view.

10. The LiDAR system of claim 1, wherein the long range imager includes a telescope.

11. The LiDAR system of claim 1, further comprising:
a front-end box housing the space qualified transmitter, the space qualified receiver, the space qualified short range imager connected to the space qualified receiver, and the space qualified long-range imager; and
a main electronics box including a laser diode assembly, laser control electronics, a digitizer, and a processor.

12. The LiDAR system of claim 11, further comprising a compact peripheral component interconnect to connect the front-end box and the main electronics box.

13. The LiDAR system of claim 1, wherein the LiDAR further comprises an optical fiber, laser diode assembly, and laser control electronics, wherein the optical fiber connect the laser diode assembly to the space-qualified transmitter.

14. A light detecting and ranging (LiDAR) system comprising:
a laser transmitter configured to transmit at least one first and second laser pulses, the laser transmitter including a microelectromechanical system (MEMS); and
a receiver configured to receive the at least one first and second laser pulses reflected back to the LiDAR system, the receiver including a first laser light detector and a second laser light detector, wherein the first laser light detector includes a plurality of photodiodes configured to receive the at least one first laser pulse, and wherein the second laser light detector includes one photodiode configured to receive the at least one second laser pulse,
wherein the transmitter further comprises a position sensitive detector (PSD) configured to determine the position of the MEMS,
wherein the LiDAR system has a range accuracy less than about 2 cm and a range resolution of less than about 1 cm,
wherein the first laser light detector operates at a range of less than 35 meters,
wherein the second laser light detector operates at a range of 30 to 12000 meters, and
wherein the first laser light detector has a wider field of view than the second laser light detector.

* * * * *